United States Patent [19]
Gotti et al.

[11] Patent Number: 6,131,706
[45] Date of Patent: Oct. 17, 2000

[54] DISC BRAKE, PARTICULARLY FOR MOTOR VEHICLES

[75] Inventors: Giovanni Gotti, Alme'; Alessandro Ciotti, Ponte San Pietro, both of Italy

[73] Assignee: Freni Brembo S.p.A., Bergamo, Italy

[21] Appl. No.: 09/165,761

[22] Filed: Oct. 2, 1998

[51] Int. Cl.⁷ ................................................ F16D 55/18
[52] U.S. Cl. ................................. 188/72.4; 188/73.47
[58] Field of Search .................. 188/71.6, 72.4, 188/73.39, 73.47, 370

[56] References Cited

U.S. PATENT DOCUMENTS

| | | | |
|---|---|---|---|
| 3,658,160 | 4/1972 | Beller et al. | 188/73.47 |
| 3,719,257 | 3/1973 | Maurice | 188/73.47 |
| 5,158,159 | 10/1992 | Thiel et al. | 188/73.45 |
| 5,472,068 | 12/1995 | Weiler et al. | 188/73.44 |
| 5,558,183 | 9/1996 | Way | 188/71.6 |
| 5,564,532 | 10/1996 | Baba et al. | 788/73.39 |

*Primary Examiner*—Chris Schwartz
*Attorney, Agent, or Firm*—Sofer & Haroun, LLP

[57] ABSTRACT

This is an invention of an improved disc brake for motor vehicles. The disc brake is of a floating caliper design with a U-shaped caliper-holder body extending through a floating caliper. Two brake pads are seated on flanges of the floating caliper. The floating caliper is a single piece, substantially rectangular, rigid frame having a hydraulic cylinder with a piston for urging the brake pads towards each other.

9 Claims, 5 Drawing Sheets

DISC BRAKE, PARTICULARLY FOR MOTOR VEHICLES

DESCRIPTION

1. Field of the Invention

The present invention relates to a disc brake, particularly for motor vehicles, of the type comprising a U-shaped caliper-holder body having opposed flanges with respective seats for housing respective pads and a floating caliper body having a seat for housing a hydraulic piston for urging the pads towards one another.

2. Background of the Invention

As is known, disc brakes of the type specified are intended to be fitted in motor cars produced on a large or very large scale. Although disc brakes of the type specified are satisfactory and substantially fulfil their purpose, they leave something to be desired from the point of view of the dissipation of heat generated during braking. This becomes more and more problematical with the constantly improving performance of mass-produced motor vehicles, for example, with regard to their speed.

The problem upon which the present invention is based is that of devising a disc brake of the type specified which has structural and functional characteristics such as to overcome the aforementioned problem.

SUMMARY OF THE INVENTION

This problem is solved by a disc brake of the type specified which is characterized in that it comprises a substantially rectangular, rigid frame through which the caliper-holder body extends and which constitutes the floating caliper body.

BRIEF DESCRIPTION OF THE DRAWINGS

Further characteristics and the advantages of the disc brake according to the present invention will become clear from the following description of an embodiment thereof, given by way of non-limiting example, with reference to the appended drawings, in which.

DETAILED DESCRIPTION OF THE INVENTION

Figure 1:
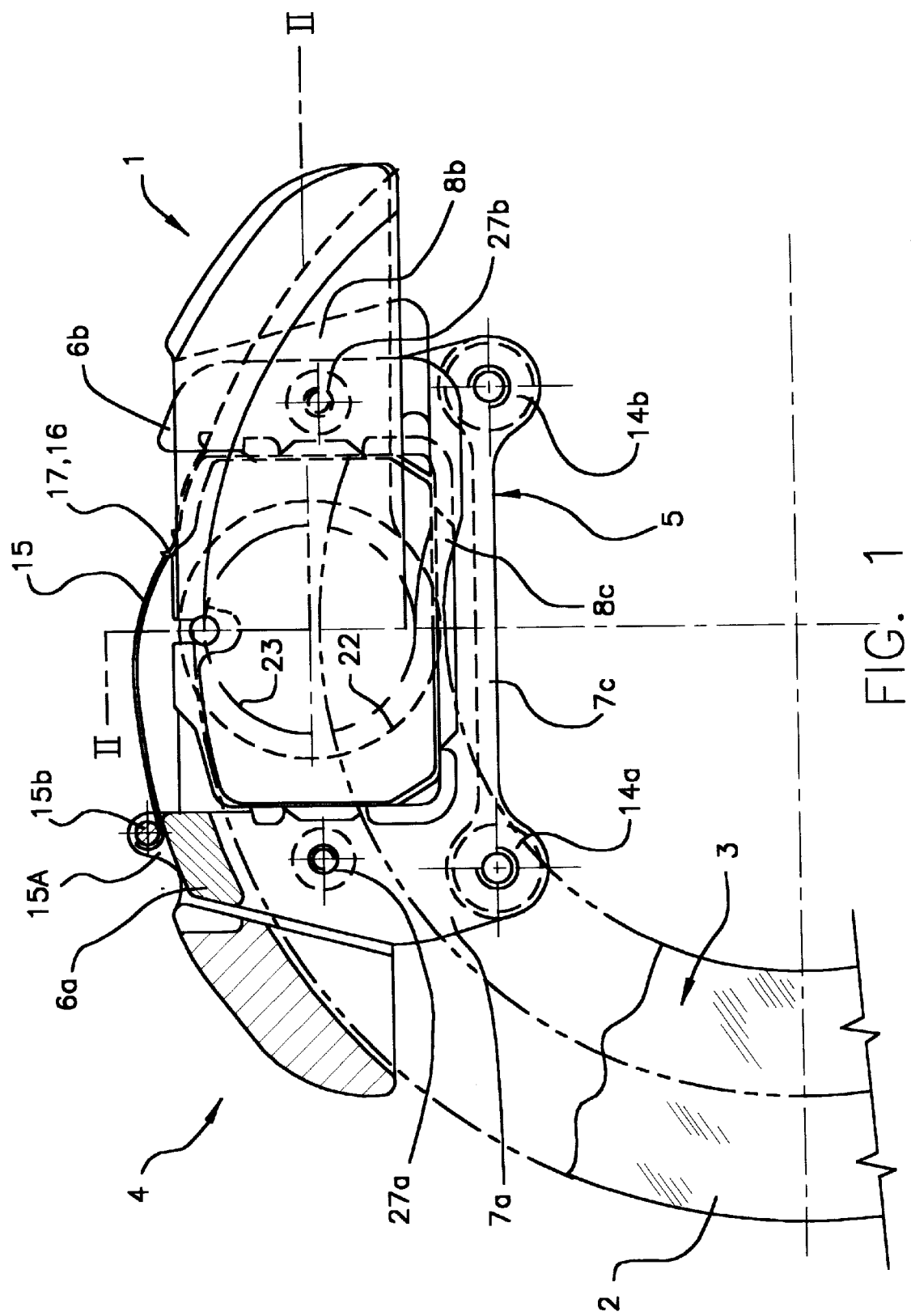
FIG. 1 is a front elevational view of a disc brake according to the invention, partially sectioned on the line I—I.
Figure 2:
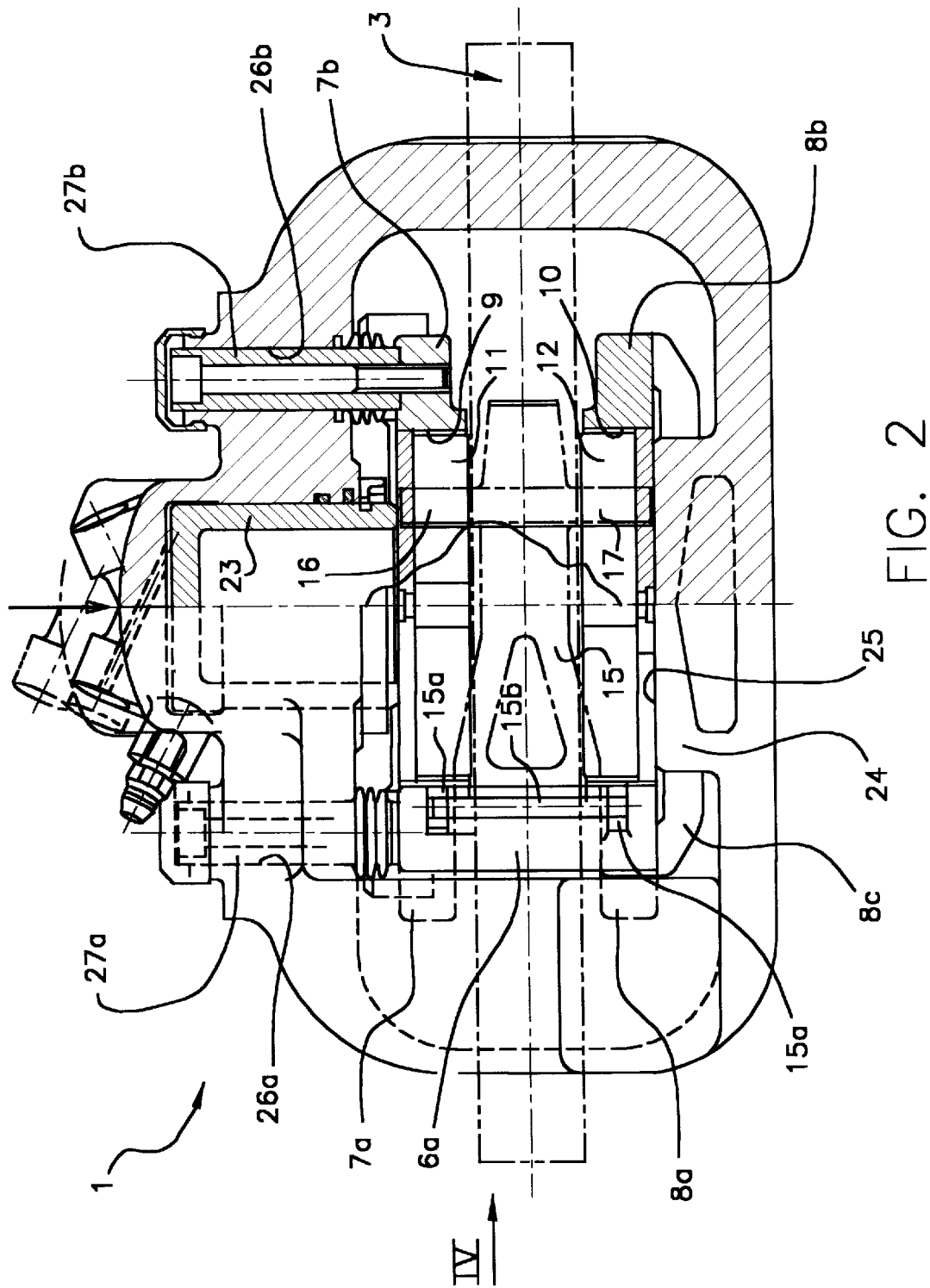
FIG. 2 is a plan view of the disc brake of FIG. 1 partially sectioned on the line II—II.
Figure 3:
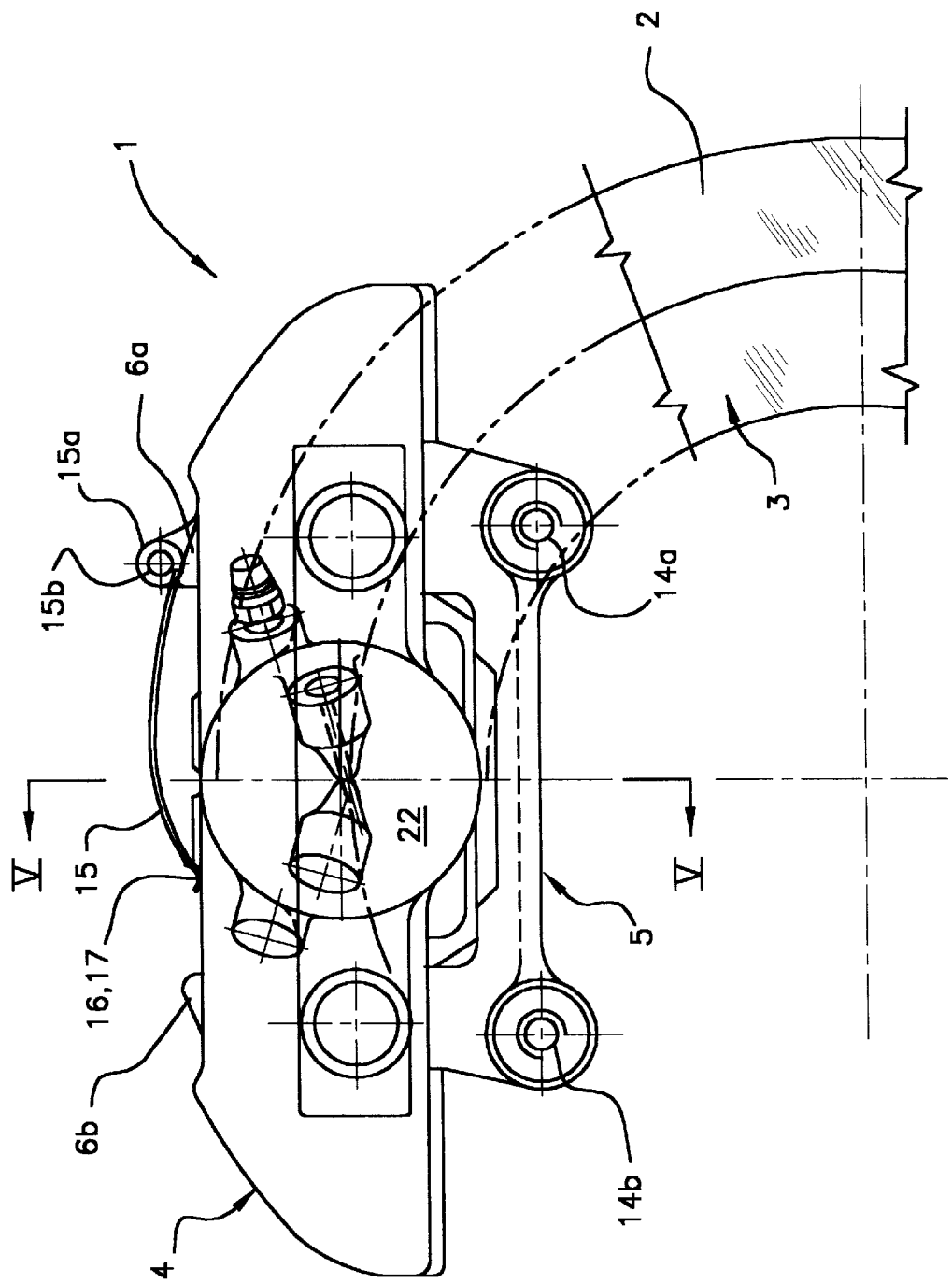
FIG. 3 is a rear elevational view of the disc brake of FIG. 1, taken on the arrow III.
Figure 4:
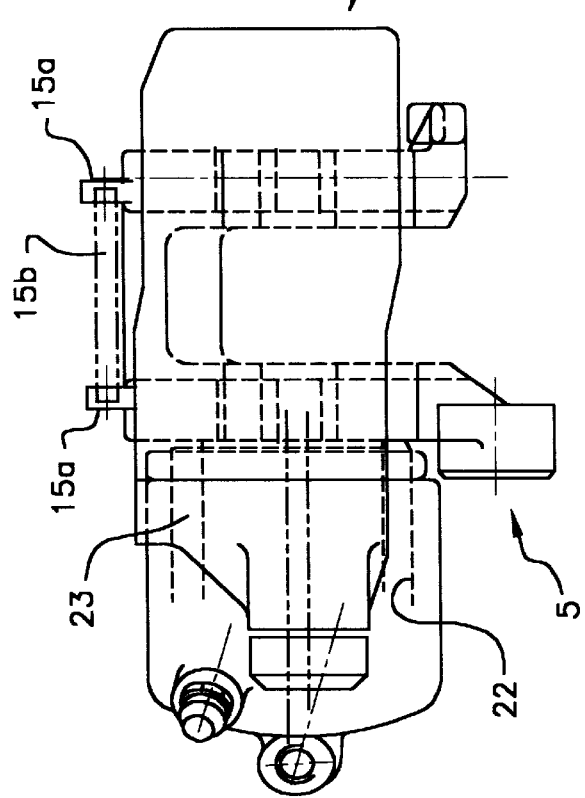
FIG. 4 is a transverse view of the disc brake of FIG. 1, taken on the arrow IV.
Figure 5:
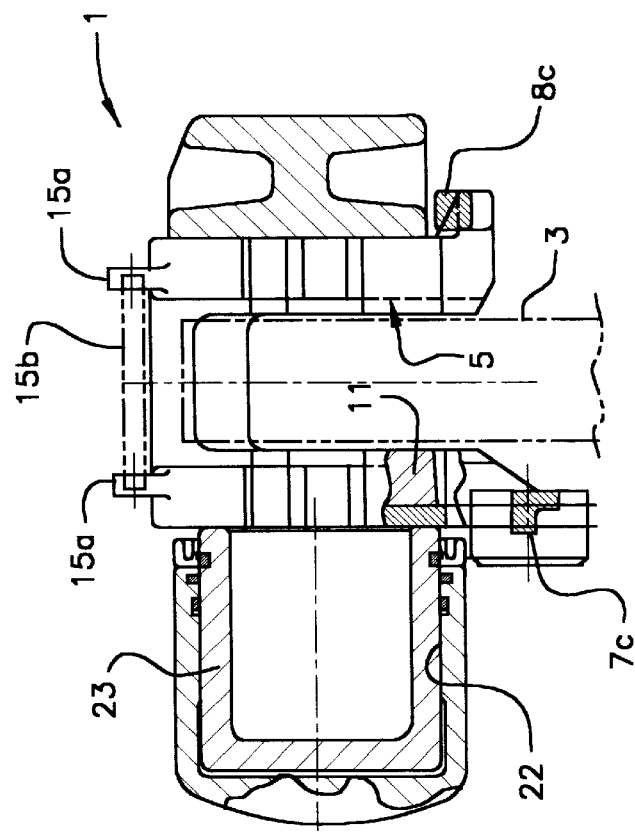
FIG. 5 is a transverse section through the disc brake of FIG. 1, taken on the line V—V.
Figure 6:
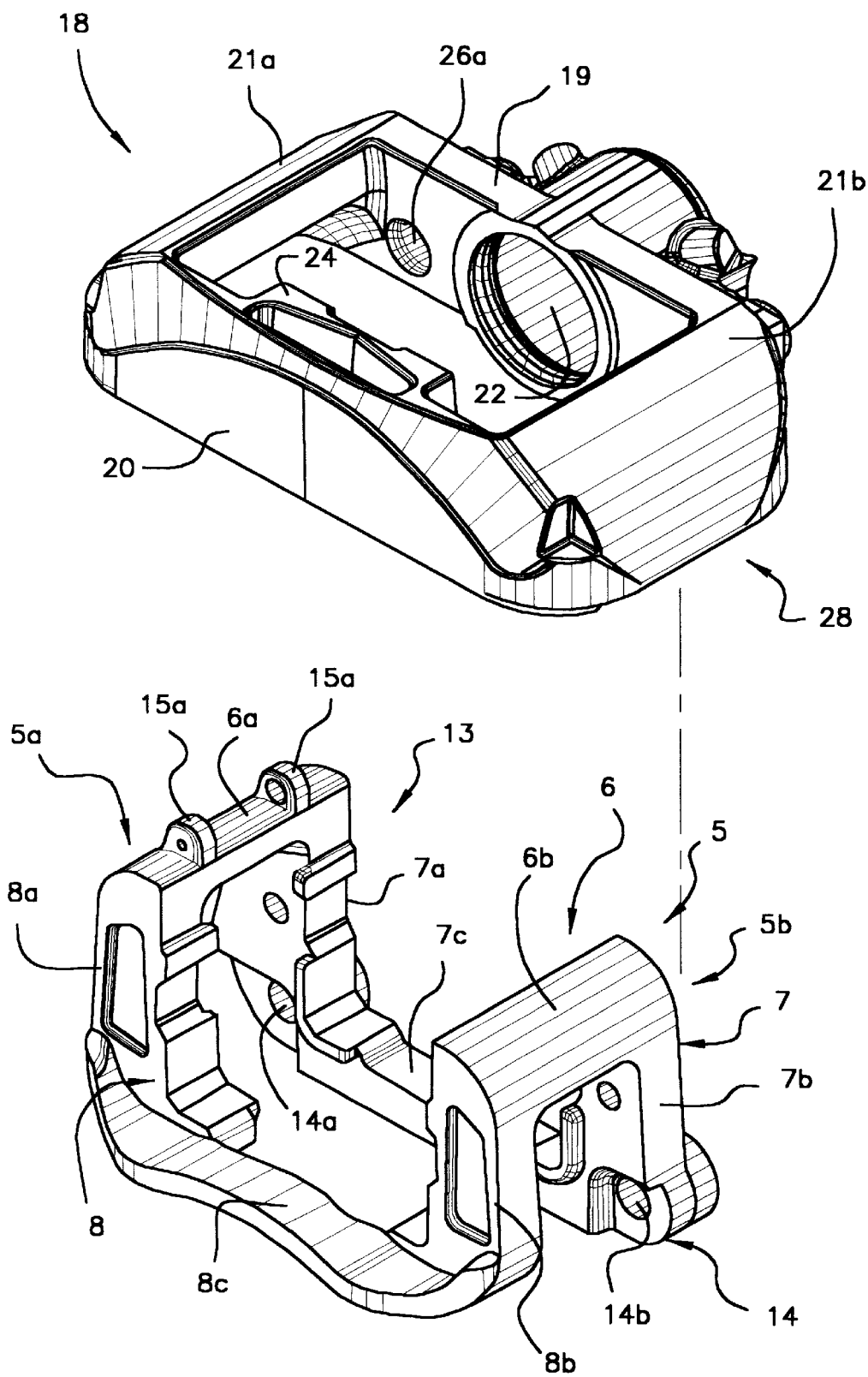
FIG. 6 is a perspective view of a detail of the disc brake of FIG. 1 with parts separated.

With reference to the appended drawings, a disc brake 1 acts on a braking band 2 of a disc 3, forming a braking unit 4, particularly for a motor vehicle, not shown.

The disc brake 1 is fixed in conventional manner to a stub axle of the motor-vehicle suspension, and the disc is fixed to a wheel of the motor vehicle.

The disc brake 1 according to the invention comprises a caliper-holder body 5 which in turn comprises a substantially plate-shaped central portion 6 and opposed flanges 7 and 8 which are also substantially plate-shaped. The central portion 6 and the opposed flanges 7 and 8 together form a U-shape which enables the caliper-holder body 5 to extend astride the braking band 2 of the disc 3, the flanges 7 and 8 lying on opposite sides of and facing the braking band.

Respective seats 9 and 10 for housing respective pads 11 and 12 are formed within the flanges 7 and 8. The caliper-holder body 5 is open throughout the width of the seats 9 and 10 with an opening 13 in the central portion 6.

In other words, the caliper-holder body 5 is formed by two U-shaped yokes, indicated 5a and 5b respectively, lying in mutually spaced-apart planes. Each yoke 5a (5b) has a substantially rod-like central portion 6a (6b) and two substantially rod-like arms 7a, 8a (7b, 8b). The two yokes 5a and 5b are connected to one another rigidly at the ends of the arms 7a and 7b and of the arms 8a and 8b, respectively, by respective bars 7c, and 8c.

The caliper-holder body 5 has eyes 14a and 14b disposed at the ends of the bar 7c for the fixing of the caliper-holder body 5 to the stub axle of the motor-vehicle suspension.

A spring 15 is provided for the vibration-free restraint of the pads 11 and 12. The spring 15 extends between the pads 11 and 12 and the caliper-holder body 5. In particular, the spring 15 is shaped substantially like a leaf spring with one end supported, by means of a pin 15b, by lugs 15a projecting from the central portion 6a, and with an opposite end fitted beneath the central portion 6b. At an intermediate point, the spring 15 has two arms 16 and 17 acting on the pads 11 and 12, respectively.

The disc brake 1 according to the invention comprises a substantially rectangular, rigid frame 18 through which the caliper-holder body 5 extends.

In other words, the rigid frame 18 surrounds the caliper-holder body 5 in the manner of a frame, that is, in the manner of a closed loop.

In particular, the rigid frame 18 is formed by opposed long sides, indicated 19 and 20 and by opposed short sides, indicated 21a and 21b.

The long side 19 extends beside the flange 7 at the level of the seat 9 for the pad 11 and has a seat 22 for a hydraulic piston 23 acting on the pad 11.

The long side 20 extends beside the flange 8 at the level of the seat 10 for the pad 12 and has a projection 24 having a flat surface 25 which faces the seat 10, and on which the pad 12 can bear.

Each of the long sides 19 and 20 extends substantially as a chord of the disc 3 or, more precisely, as a chord of the circumference of the disc.

The short sides 21a and 21b extend beside the yokes 5a and 5b parallel to the respective central portions 6a and 6b.

Both the long sides and the short sides of the frame have substantially rectangular cross-sections. The long sides face the caliper-holder body with their flat sides, and the short sides open out towards the disc in order to fit the curvature of its periphery.

On either side of the seat 22 for the piston 23 in the long side 19, the frame 18 has two cylindrical seats 26a and 26b which engage for sliding in a guided manner on two guide pins 27a and 27b fixed to the caliper-holder body 5 in the arms 8a and 8b.

At this point, it is clear that the frame 18 constitutes basically a floating caliper body 28 which, with the caliper-holder body 5, completes the disc brake 1.

The frame 18 is advantageously made in a single piece by casting, for example, of aluminum alloy.

In operation, during braking, as a result of the thrust of the piston 23 against the pad 10, the frame 18, that is, the caliper body 28, moves or floats along the guide pins until both the pad 10 on which the piston 23 acts and the opposed pad 12 which bears on the flat surface 25 come into contact, under pressure, with the braking band 2 and act thereon with equal and opposite forces.

The heat generated by friction between the pads and the braking band can be carried away by an air-flow which passes freely in a radial direction through the frame surrounding the caliper-holder body and passes through the opening 13 formed in the caliper-holder body.

The main advantage of the disc brake according to the present invention lies in its large heat-dissipation capacity.

A further advantage of the disc brake according to the present invention lies in the fact that the replacement of the pads is facilitated.

A further advantage of the disc brake according to the present invention is that it can be produced so as to be rigid and of light weight; the caliper-holder body in fact has a closed-loop structure which is the best for the 4 purposes of withstanding the braking stress.

A further advantage of the disc brake according to the present invention lies in the fact that it offers optimal resistance to the braking stress.

A further advantage of the disc brake according to the present invention is that it can be produced so as to be aesthetically agreeable and can be marked with letters or symbols by virtue of the fact that it provides a large and smooth visible surface such as that of the larger side of the frame.

Finally, in the disc brake according to the present invention, both the detachment of the pads from the disc after braking and the sliding of the caliper body on the caliper-holder body are favoured by the particular positioning of the pad-restraint spring.

Naturally, in order to satisfy contingent and specific requirements, an expert in the art may apply to the above-described disc brake many modifications and variations all of which, however are included within the scope of protection of the invention as defined by the following claims.

We claim:

1. A disk brake comprising:

a U-shaped caliper-holder having opposed flanges, said U-shaped caliper-holder being adapted to be disposed astride of a disk with said opposed flanges facing first and second braking disk surfaces, said opposing flanges having respective seats for housing respective pads adapted to work on said braking disk surfaces; and a rectangular unitary rigid floating caliper body having a seat for housing a hydraulic piston for urging the pads towards one another, said rectangular unitary floating caliper body having a pair of first opposed sides disposed transversely to said opposed flanges, a pair of second opposed sides disposed parallel to said opposed flanges, said hydraulic piston mounted in one of said second opposed sides, and an opened top region, wherein said rectangular unitary rigid floating caliper body is positioned along an axis to engagingly enclose said U-shaped caliper-holder so that when said caliper-holder is coupled with said rectangular unitary rigid floating caliper body, said opposed flanges of said U-shaped caliper-holder are peripherally surrounded by said sides of said rectangular unitary rigid floating caliper body.

2. A disk brake according to claim 1, wherein said unitary rigid floating caliper body is cast in one piece.

3. A disk brake according to claim 1, wherein a portion of said U-shaped caliper-holder protrudes from said opened top region.

4. A disk brake according to claim 1, wherein said rectangular unitary rigid floating caliper body is fabricated from an aluminum alloy.

5. A disk brake according to claim 1, wherein said disk brake further comprises respective pads housed in said respective seats of said U-shaped caliper-holder.

6. A disk brake according to claim 5, wherein said u-shaped caliper-holder further comprises a spring that extends between said pads and said U-shaped caliper-holder for restraining said pads.

7. A disk brake according to claim 1, wherein said U-shaped caliper-holder further comprises at least one guide pin and said rectangular unitary rigid floating caliper body further comprises at least one cylindrical seat that is configured to slidingly engage said at least one corresponding guide pin of said U-shaped caliper-holder.

8. A disk brake according to claim 1, wherein said rectangular unitary rigid caliper body is pan-shaped.

9. A disk brake according to claim 1, wherein said opened top region of said rectangular unitary rigid floating caliper body allows for heat dissipation.

\* \* \* \* \*

UNITED STATES PATENT AND TRADEMARK OFFICE
CERTIFICATE OF CORRECTION

PATENT NO. : 6,131,706  
DATED : October 17, 2000  
INVENTOR(S) : Gotti et al.

Page 1 of 1

It is certified that error appears in the above-identified patent and that said Letters Patent is hereby corrected as shown below:

<u>Title page,</u>  
Item [30] should read -- M197A002519   Italy   November 12, 1997 --

Signed and Sealed this

Twenty-eighth Day of May, 2002

*Attest:*

*Attesting Officer*

JAMES E. ROGAN  
*Director of the United States Patent and Trademark Office*

UNITED STATES PATENT AND TRADEMARK OFFICE
CERTIFICATE OF CORRECTION

PATENT NO.    : 6,131,706
DATED         : October 17, 2000
INVENTOR(S)   : Gotti et al.

It is certified that error appears in the above-identified patent and that said Letters Patent is hereby corrected as shown below:

<u>Title page,</u>
Item [30] should read -- MI97A002519  Italy  November 12, 1997 --

This certificate supersedes Certificate of Correction issued May 28, 2002

Signed and Sealed this

Tenth Day of September, 2002

Attest:

Attesting Officer

JAMES E. ROGAN
*Director of the United States Patent and Trademark Office*